(12) United States Patent
Michaud

(10) Patent No.: US 7,037,866 B2
(45) Date of Patent: May 2, 2006

(54) TWO-SIDED NONWOVEN FABRIC

(75) Inventor: R. John Michaud, Green Bay, WI (US)

(73) Assignee: Green Bay Nonwovens, Inc., Green Bay, WI (US)

( * ) Notice: Subject to any disclaimer, the term of this patent is extended or adjusted under 35 U.S.C. 154(b) by 217 days.

(21) Appl. No.: 10/213,152

(22) Filed: Aug. 5, 2002

(65) Prior Publication Data

US 2004/0023584 A1 Feb. 5, 2004

(51) Int. Cl.
*D04H 1/46* (2006.01)
*D04H 3/10* (2006.01)
*D04H 5/02* (2006.01)

(52) U.S. Cl. ............... 442/408; 442/59; 442/103; 442/104; 442/148; 442/381; 442/382; 442/384; 442/389; 442/401; 442/357; 28/103; 28/104

(58) Field of Classification Search .............. 442/59, 442/103, 104, 148, 381, 382, 384, 389, 401, 442/408, 357; 28/103, 104
See application file for complete search history.

(56) References Cited

U.S. PATENT DOCUMENTS

| | | | |
|---|---|---|---|
| 3,485,705 A | 12/1969 | Harmon | 161/59 |
| 3,770,560 A | 11/1973 | Newman | 161/156 |
| 4,239,792 A | 12/1980 | Ludwa | 428/198 |
| 4,275,105 A | 6/1981 | Boyd et al. | 428/198 |
| 4,659,609 A * | 4/1987 | Lamers et al. | 428/194 |
| 4,823,427 A | 4/1989 | Gibbs et al. | 15/247 |
| 5,026,587 A * | 6/1991 | Austin et al. | 428/91 |
| 5,141,803 A * | 8/1992 | Pregozen | 442/123 |
| 5,145,727 A | 9/1992 | Potts et al. | 428/198 |
| 5,229,191 A | 7/1993 | Austin | 428/198 |
| 5,308,673 A | 5/1994 | Tochacek et al. | 428/102 |
| 5,334,446 A | 8/1994 | Quantrille et al. | 428/284 |
| 5,393,599 A | 2/1995 | Quantrille et al. | 428/284 |
| 5,415,925 A | 5/1995 | Austin et al. | 428/287 |
| 5,616,408 A | 4/1997 | Oleszczuk et al. | 442/346 |
| 5,652,041 A * | 7/1997 | Buerger et al. | 428/198 |
| 5,766,737 A | 6/1998 | Willey et al. | 428/198 |
| 5,804,512 A | 9/1998 | Lickfield et al. | 442/346 |
| 6,177,370 B1 | 1/2001 | Skoog et al. | 442/387 |
| 6,268,302 B1 | 7/2001 | Ofosu et al. | 442/407 |
| 6,274,238 B1 | 8/2001 | DeLucia | 428/373 |
| 6,315,864 B1 | 11/2001 | Anderson et al. | 162/109 |
| 6,372,172 B1 | 4/2002 | Sudduth et al. | 264/289.3 |
| 6,383,958 B1 | 5/2002 | Swanson | 442/151 |
| 6,797,655 B1 * | 9/2004 | Rudisill | 442/400 |
| 2001/0008180 A1 | 7/2001 | Anderson et al. | 162/111 |
| 2002/0037679 A1 | 3/2002 | Bansal et al. | 442/415 |
| 2002/0146956 A1 * | 10/2002 | Ngai | 442/381 |

FOREIGN PATENT DOCUMENTS

GB 1209775 * 10/1970

* cited by examiner

*Primary Examiner*—Norca L. Torres
(74) *Attorney, Agent, or Firm*—Holland & Knight LLP

(57) ABSTRACT

A nonwoven fabric comprises a first layer formed of staple fibers having a smooth outer surface, a second layer formed of staple fibers having an outer surface with a roughened texture and a third, spunbond layer sandwiched between the first and second layers. A binder material is applied to the second layer which substantially covers its textured surface and is effective to resist deformation under the application of pressure even in the presence of liquid.

16 Claims, 2 Drawing Sheets

TWO-SIDED NONWOVEN FABRIC

FIELD OF THE INVENTION

This invention relates to nonwoven fabric, and, more particularly, to a nonwoven fabric having a smooth side and a textured side formed with a pattern wherein a binder material is applied to the textured side to resist deformation of the pattern during use.

BACKGROUND OF THE INVENTION

Nonwoven fabric or sheet material is commonly employed in a variety of applications as a substitute for cloth such as diapers, towels, tissues, wipes, medical drapes and the like. Made from various combinations of synthetic and natural fibers and filaments, nonwoven fabric is highly versatile in terms of the properties which can be obtained to satisfy the needs of a particular application. Regardless of the end use of the material, it is important that the nonwoven fabric simulate the "hand" or feel and other performance characteristics of woven materials such as cloth in order to gain consumer acceptance.

In some instances, it is desirable to provide a sheet material having at least one textured or roughened surface for scrubbing. In the particular application of a facial wipe, for example, the roughened surface of the wipe can be utilized to exfoliate dead skin cells. Once these cells are removed, a smooth, soft surface is needed to wipe the skin clean.

Woven sheet materials are commonly knitted with textured or roughened surfaces which can be used to scrub the skin. One limitation of the process for forming a woven sheet or fabric is that both sides of the finished article, e.g., a washcloth, have the same texture. As such, no smooth surface is available to wipe the skin clean after exfoliation.

As noted above, nonwoven webs or fabric sheets can be formed to simulate the characteristics of woven fabric. A textured or roughened surface can be applied to a web of nonwoven fabric using a calendar roller, a hydroentangling sleeve or other techniques. Although similar to the feel of a woven cloth, it has been found that textured surfaces conventionally formed on nonwoven fabrics tend to deform or flatten out when pressure is applied, particularly when wet. If used as a facial wipe to scrub the skin, conventional nonwoven fabrics with one or more textured surfaces are likely to quickly deform and become ineffective to properly exfoliate the skin. Additionally, nonwoven fabrics are not readily available with a roughened or textured surface on one side and a smooth, soft surface on the opposite side.

SUMMARY OF THE INVENTION

It is therefore among the objectives of this invention to provide a nonwoven fabric which is capable of effectively scrubbing a surface even when wetted, which is comparatively strong and which has a smooth surface for wiping.

These objectives are accomplished in a nonwoven fabric comprising a first layer formed of staple fibers having a smooth outer surface, a second layer formed of staple fibers having an outer surface with a roughened texture and a third, spunbond layer sandwiched between the first and second layers. A binder material is applied to the second layer which substantially covers its textured surface and is effective to resist deformation thereof under the application of pressure even in the presence of liquid.

In the presently preferred embodiment, the staple fibers forming the first and second layers are made of a synthetic material such as rayon, polyester, polypropylene, acrylic, polyethylene or a bicomponent, e.g., an inner core of polyester and an outer core of polypropylene. Each of the first and second layers are carded webs formed by a dry-laid process which is well known in the art.

A hydroentangling sleeve is employed to impart a texture or roughened feel to the outer surface of the second layer, opposite to where it contacts the third layer. A binder material, such as ethylene vinyl acetate, is then applied to the outer surface of the second layer using a roller or sprayers so that the binder material covers the outer surface and at least partially penetrates the second layer. It has been found that the binder material is effective to resist deformation of the roughened, outer surface of the second layer when pressure is applied, such as when scrubbing one's face with the nonwoven fabric herein. This resistance to deformation is substantially maintained even in the presence of liquid.

As is well known, a spunbond web is typically made from essentially continuous filaments formed of thermoplastic materials. In the presently preferred embodiment, the third, spunbond layer of this invention is sandwiched between the first and second layers which are then hydroentangled with one another using conventional techniques. The resulting nonwoven fabric therefore consists of a three layer laminate having a textured surface on one side and a smooth surface on the opposite side. Since the staple fibers forming the first layer are made of synthetic material, the smooth surface of the laminate is soft to the touch.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE PREFERRED EMBODIMENT

Figure 1:
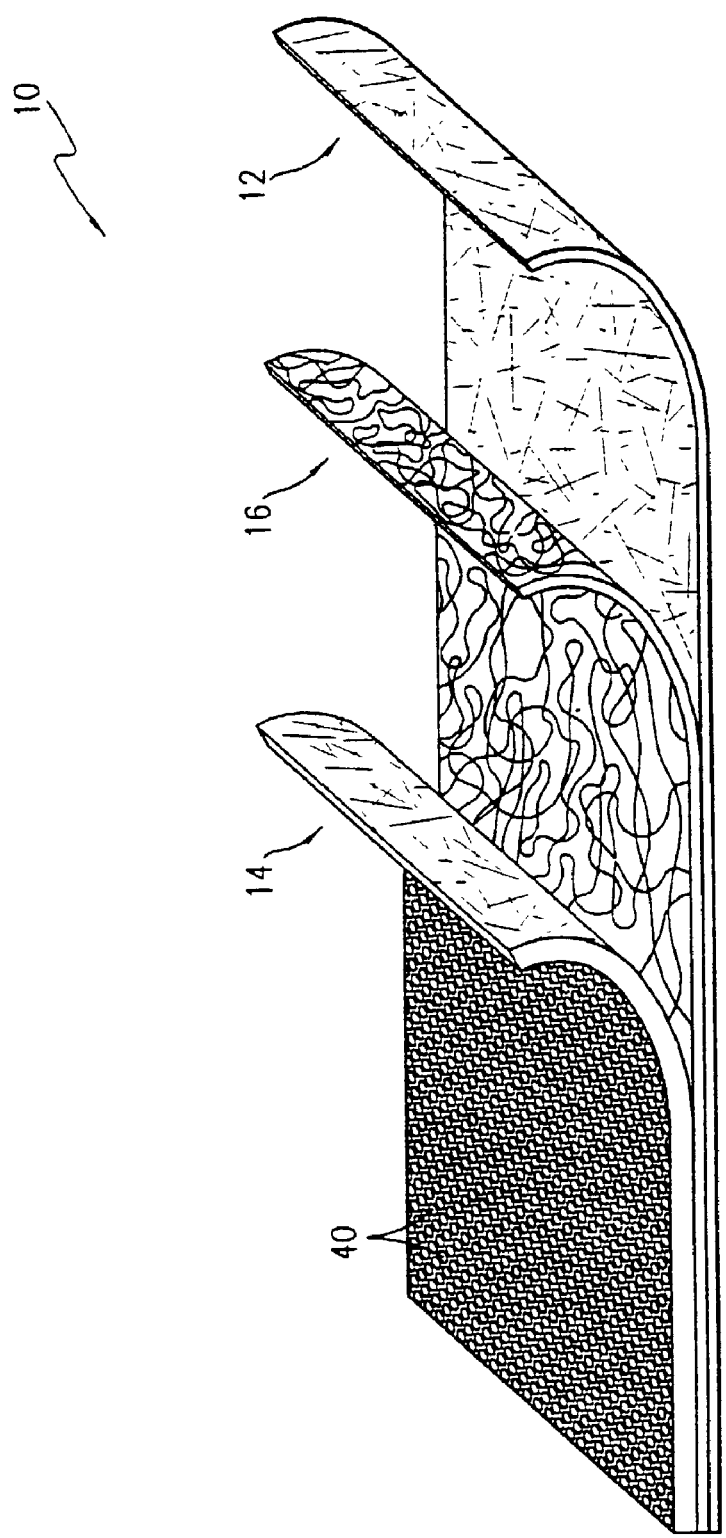
FIG. 1 is a perspective view of nonwoven fabric of this invention with the layers partially separated from one another.

For purposes of the present discussion, a number of definitions are provided of terms used to described the subject invention.

The term "nonwoven web" as used herein refers to a matrix of fibers forming a web which are randomly interlaid with one another in no particular pattern. Processes such as meltblowing, spunbonding, wet-forming and carded web processes are well-known in the art and commonly employed to form a nonwoven web.

The term "spunbond web" refers to a web made from one or more essentially continuous filaments, usually circular in shape, which are extruded from thermoplastic material and then rapidly reduced in diameter, e.g. by fluid-drawing or other spunbonding techniques. See, for example, U.S. Pat. No. 4,340,563.

The term "thermoplastic material" refers to a polymer which softens when exposed to heat and returns to its original condition at room temperature. Styrene polymers and copolymers, vinyls, polyethylenes, polypropylenes and acrylics are examples of thermoplastic materials.

The term "staple fiber" means a fiber which has been cut from a filament, and is typically on the order of about 4 to 20 cm in length.

"Basis weight" as used herein refers to the weight per unit area of a nonwoven fabric, usually expressed in gpm, i.e. grams per square meter.

A "bicomponent fiber" refers to a fiber having an outer sheath surrounding an inner core. Typical sheath/core combinations include polyolefin/polyester, polypropylene/polyester and polyethylene/polyethylene terephthalate.

Referring now to the drawings, the three-layer laminated nonwoven fabric 10 of this invention is formed of a first layer 12, a second layer 14 and a third layer 16 sandwiched between the first and second layers 12, 14. In the presently preferred embodiment, the first layer 12 is a carded nonwoven web 15 having a basis weight in the range of about 18 to 45 grams per square meter which is formed of synthetic staple fibers such as rayon, acrylic, polyester, polypropylene, polyethylene, polyolefins, nylon, bicomponent and others. Preferably, the staple fibers forming the first layer 12 are present within the nonwoven fabric 10 in an amount equal to in the range of about 8% to 33% by weight.

The third layer 16 is preferably a spunbond web 17 having a basis weight in the range of about 15 to 45 grams per square meter which is formed from a thermoplastic material, as defined above. Preferably, the spunbond web 17 forming the third layer 16 is present within the nonwoven fabric 10 in an amount equal to in the range of about 8% to 33% by weight.

The second layer 14 of the nonwoven sheet 10 is a carded nonwoven web 18 consisting of essentially the same staple fibers as the first layer 12, but with increased basis weight. The basis weight of the second layer 14 is preferably in the range of about 45 to 180 grams per square meter, and the staple fibers which form the second layer 14 are present with the nonwoven fabric 10 preferably in an amount equal to in the range of about 33% to 83% by weight.

As noted above, there is a need for a nonwoven material having a textured or roughened surface on one side, and a smooth, soft surface on the opposite side. One particular application for this type of nonwoven fabric is a facial wipe in which the roughened surface is used to exfoliate the skin and the opposite, smooth side wipes the skin clean. The three-layer construction of the nonwoven fabric 10 of this invention is particularly designed with the foregoing in mind.

Figure 2:
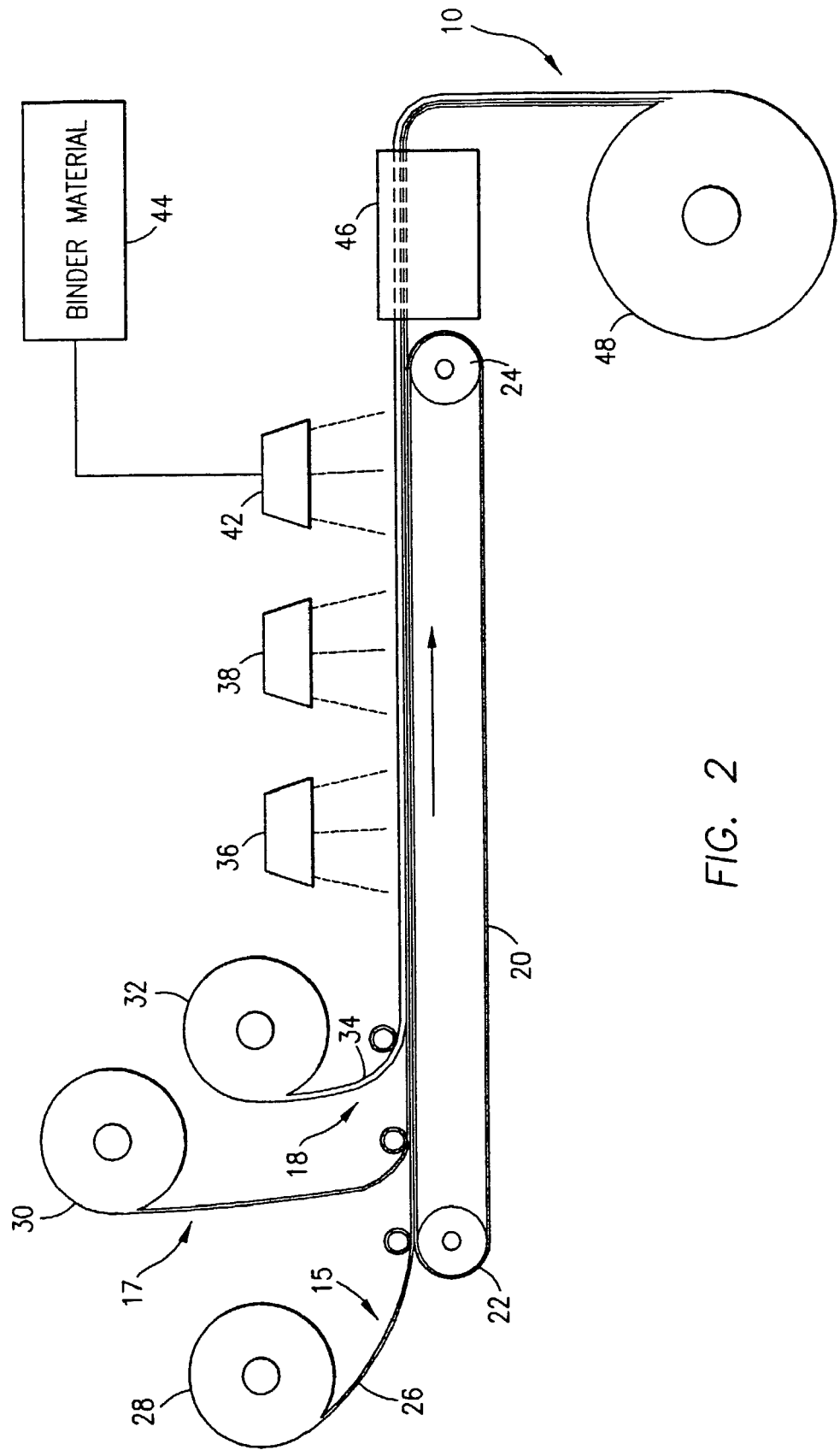
FIG. 2 is a schematic view of the process of forming the nonwoven fabric of this invention.

With reference to FIG. 2, a schematic drawing is provided depicting processing steps for manufacturing the nonwoven fabric 10 of this invention. An endless belt 20 extending between opposed rollers 22 and 24 receives and contacts the outer surface 26 of the web 15 forming the first layer 12 as it is unwound from a roll 28. The outer surface 26 of first layer 12 is smooth, and soft to the touch in view of the synthetic staple fibers from which it is made. The spunbond web 17 forming the third layer 16 of the nonwoven fabric 10 is then unwound from the roll 30 and placed on top of the web 15. In turn, the web 18 forming the second layer 14 of the nonwoven fabric 10 is unwound from roll 32 atop the web 17 such that the outer surface 34 of the web 18 faces upwardly in the orientation depicted in FIG. 2.

The process of hydroentanglement is well known in the art as a means of bonding fibers together without the application of chemical bonding agents. A manifold head is located above the one or more webs of fibers supported by a belt. The manifold head is formed with a number of closely spaced discharge outlets connected to a high pressure source of water. The discharge outlets direct water jets into contact with the webs causing their fibers to move and rearrange themselves in different directions. In the course of such movement, the fibers become entangled with one another creating a strong bond in the resulting nonwoven fabric.

As shown in FIG. 2, a first manifold head 36 is located over the belt 20 in a position downstream from where the three webs 15, 17 and 18 are initially laid one on top of the other. The first manifold head 36 is effective to provide preliminary entanglement of the fibers of webs 15, 17 and 18 with one another to ensure that they do not separate in subsequent processing steps. The three webs 15, 17 and 18 are then passed beneath a hydroentangling sleeve 38 located downstream from the manifold 36. The hydroentangling sleeve 38 is well known in the art, forms no part of this invention and is therefore not discussed in detail herein. For purposes of the present discussion, the hydroentangling sleeve 38 is formed with discharge outlets arranged in a selected pattern which are effective to direct high pressure jets of water toward the outer surface 34 of the carded nonwoven web 18 forming the second layer 14 of the fabric 10. The particular pattern of the discharge outlets, and the pressure with which the water jets are emitted therefrom, is effective to drive or force fibers in selected locations along the web 18 downwardly, toward the belt 20, in the orientation shown in FIG. 2. Areas in between where the water jets impact the web 18 form a pattern of raised areas or dimples 40 which provide a textured or roughened feel to the outer surface 34 of the web 18, and thus to the second layer 14 of the nonwoven fabric 10. See FIG. 1.

The relatively high pressure at which the water jets are delivered from the hydroentangling sleeve 38 creates a substantial downward force on the fibers within web 18 which are impacted by the water jets. The spunbond web 17 located immediately beneath the web 18 functions essentially as a barrier layer to prevent such fibers from passing into the web 15 and/or onto the conveyor belt 20. Without the spunbond web 17, the fibers from the web 18 would be forced into the web 15 of the first layer 12 thus forming a reverse pattern of dimples on its outer surface 26 instead of the desired, smooth surface. The presence of the spunbond web 17 also causes the dimples 40 to better retain their shape, thus creating improved definition in the particular pattern formed on the outer surface 34 of the second layer 14.

While the dimples 40 are well defined after passing beneath the hydroentangling sleeve 38, some means is needed to help them to resist deformation when the nonwoven fabric 10 is in use, particularly in the presence of a liquid. This feature is provided in the present invention by the inclusion of a spray head 42 connected to a source 44 of binder material such as ethylene vinyl acetate, acrylics and similar materials. The spray head 42 directs the binder material onto second layer 14 where it covers the outer surface 34 and at least partially penetrates into the web 18. In the presently preferred embodiment, the binder material is present within the nonwoven fabric 10 in an amount equal to about 0.1% to 25% by weight. The binder material reinforces the dimples 40 helping them to resist surface abrasion which can lead to deformation. If the dimples 40 were to become deformed, they would be unable to provide the desired degree of texture or roughness needed to effectively scrub a surface such as the skin of the face. After the application of the binder material, the now completely formed nonwoven sheet 10 is passed through a dryer 46 and wound on a roll 48.

An improved nonwoven fabric 10 according to this invention is therefore provided having a first layer 12 with a smooth outer surface 26, and a second layer with a roughened, textured outer surface 34 located opposite the outer surface 26. The synthetic staple fibers used to form each layer 12 and 14 provide acceptable strength, which is enhanced by the spunbond web 17 forming the third layer 16, and such fibers create a soft feel on the smooth outer surface 26 of the first layer 12.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof.

For example, the particular pattern of dimples 40 on the outer surface 34 of the second layer 14 is shown for purposes of illustration, and a variety of other patterns or textures could be formed thereon to provide a textured feel. Although a hydroentangling sleeve 38 is shown and described as imparting the dimple pattern on the outer surface 34, it should be understood that other devices could be used such as a patterning belt. Additionally, the process of forming the nonwoven fabric 10 depicted in FIG. 2 is diagrammatic and intended to generally show the sequence of processing steps employed in the present invention. For example, the binder material can be applied with a roller instead of the spraying device shown in FIG. 2.

Therefore, it is intended that the invention not be limited to the particular embodiment disclosed as the best mode contemplated for carrying out this invention, but that the invention will include all embodiments falling within the scope of the appended claims.

I claim:

1. A nonwoven fabric, comprising:
   a first layer formed solely of synthetic staple fibers, said first layer having an inner surface and a smooth outer surface;
   a second layer formed solely of synthetic staple fibers, said second layer having an inner surface and an outer surface with a textured pattern;
   a third layer formed of spunbond filaments which is located between said inner surface of said first layer and said inner surface of said second layer, said staple fibers of said first and second layers being hydroentangled with said spunbond filaments of said third layer to connect said layers together;
   a binder material applied over said textured pattern of said outer surface of said second layer, said binder material being effective to resist deformation of said textured pattern.

2. The nonwoven fabric of claim 1 in which said synthetic staple fibers forming said first layer are selected from the group consisting of polyethylene, polypropylene, rayon, polyester, acrylic, polyolefins, nylon and bicomponent materials.

3. The laminated nonwoven fabric of claim 1 in which said synthetic staple fibers forming said second layer are selected from the group consisting of polyethylene, polypropylene, rayon, polyester, acrylic, polyolefins, nylon and bicomponent materials.

4. The nonwoven fabric of claim 1 in which said spunbond filaments of said third layer are formed of thermoplastic materials selected from the group consisting of vinyls, polyethylenes, polypropylenes and acrylics.

5. The nonwoven fabric of claim 1 in which said binder material is selected from the group of ethylene vinyl acetate and acrylic.

6. The nonwoven fabric of claim 1 in which said first layer has a basis weight in the range of about 15 to 45 grams per square meter.

7. The nonwoven fabric of claim 1 in which said second layer has a basis weight in the range of about 45 to 180 grams per square meter.

8. The nonwoven fabric of claim 1 in which said third layer has a basis weight in the range of about 15 to 45 grams per square meter.

9. The nonwoven fabric of claim 1 in which said synthetic staple fibers of said first layer are present in an amount in the range of about 8% to 33% by weight.

10. The nonwoven fabric of claim 1 in which said spunbond filaments of said third layer are present in an amount in the range of about 8% to 33% by weight.

11. The nonwoven fabric of claim 1 in which said synthetic staple fibers of said second layer are present in an amount in the range of about 33% to 83% by weight.

12. The nonwoven fabric of claim 1 in which said binder material is present in an amount in the range of about 0.1% to 25% by weight.

13. A method of manufacturing a nonwoven fabric, comprising:
    (a) providing a first web formed solely of synthetic staple fibers having an inner surface and a smooth outer surface;
    (b) providing a second web formed solely of synthetic staple fibers having an inner surface and an outer surface;
    (c) providing a third web of spunbond filaments;
    (d) locating said third web between said inner surfaces of said first and second webs;
    (e) hydroentangling said staple fibers of said first and second webs with said spunbond filaments of said third web to connect said webs together;
    (f) forming a textured pattern on said outer surface of said second web; and (g) applying a binder material over said textured pattern on said outer surface of said second web.

14. The method of claim 13 in which step (f) comprises employing a hydroentangling sleeve to form said textured pattern on said outer surface of said second web.

15. The method of claim 13 in which step (g) comprises applying ethylene vinyl acetate or acrylic over said textured pattern on said outer surface of said second web.

16. A nonwoven fabric, comprising:
    a first layer formed solely of synthetic staple fibers, said first layer having an inner surface, a smooth outer surface and a first basis weight;
    a second layer formed solely of synthetic staple fibers, said second layer having an inner surface, an outer surface with a textured pattern and a second basis weight which is greater than said first basis weight;
    a third layer formed of spunbond filaments which is located between said inner surface of said first layer and said inner surface of said second layer, said staple fibers of said first and second layers being hydroentangled with said spunbond filaments of said third layer to connect said layers together;
    a binder material applied over said textured pattern on said outer surface of said second layer, said binder material being effective to resist deformation of said textured pattern.

* * * * *